United States Patent Office 3,851,012
Patented Nov. 26, 1974

3,851,012
RUBBER COMPOSITIONS CONTAINING A HEAT HARDENABLE PHENOLIC RESIN BASED ON A MIXTURE OF A DIHYDROXY DIPHENYL ALKANE AND A PARA-SUBSTITUTED ALKYL PHENOL
William I. Wertz, East Brunswick, and Stanley H. Richardson, Millington, N.J., assignors to Union Carbide Corporation, New York, N.Y.
No Drawing. Filed Aug. 7, 1972, Ser. No. 278,277
Int. Cl. B32b 27/42; C08d 9/10; C08g 37/16
U.S. Cl. 260—845
17 Claims

ABSTRACT OF THE DISCLOSURE

The disclosure of this application is directed to rubber compositions, containing a heat-hardenable phenolic resin based on a mixture of a dihydroxy diphenyl alkane and a para-substituted alkyl phenol, which are particularly suitable for use as adhesives, especially for adhesive bonding of thermoplastic vinyl film to substrates such as metal and the like to form composite structures wherein little if any staining or discoloration of the vinyl film occurs due to the "adhesive" composition, as the composite structures age.

---

This invention relates to rubber compositions containing a heat-hardenable phenolic resin based on a mixture of a dihydroxy diphenyl alkane and a para-substituted alkyl phenol. More particularly, this invention relates to rubber compositions, as defined, which are especially desirable for use as adhesives in the bonding of thermoplastic vinyl film to substrates such as metal and the like to form composite structures, wherein little if any staining of the vinyl film occurs, due to the "adhesive composition," as the composite structures age.

Phenolic resins, as for example, phenol-formaldehyde resins have been added to rubber compositions in order to improve the "bonding" strength thereof when these compositions are used as adhesives to bond thermoplastic films, such as vinyl films, to substrates such as metal and the like to form composite structures. Although the addition of phenolic resins, as described, to rubber compositions does improve the "bonding" strength of such compositions, providing for excellent adhesion of thermoplastic vinyl films to various substrates, it has been found these rubber compositions undesirably stain or discolor the vinyl films as the composite structures age.

The present invention provides rubber compositions which effect the adhesive bonding of thermoplastic vinyl film to various substrates without undesirably staining or discoloring the vinyl film.

The compositions of this invention comprise a heat-hardenable phenolic resin, based on a mixture of a dihydroxy diphenyl alkane and a para-substituted alkyl phenol; and a rubber wherein the rubber is present in the composition in an amount of about 50 to about 400 percent by weight and preferably about 100 to about 200 percent by weight based on the weight of the heat-hardenable phenolic resin (on a solid basis).

In those instances wherein the phenolic resin is a liquid, the "solids" content thereof is determined according to the following procedure. A 1.5 gram sample of the resin is heated in an oven, which is at a temperature of 135° C., for three hours. The residue is then cooled to room temperature, about 23° C., and weighed. The numerical weight of the residue is divided by the numerical weight of the sample and the result multiplied by 100. The result obtained indicates the percent weight, on a solids basis, of 1.5 grams of liquid resin.

The heat-hardenable phenolic resins of this invention are the condensation reaction products of a mixture containing:

(1) an aldehyde
(2) dihydroxy diphenyl alkane and
(3) a para-substituted alkyl phenol Illustrative of suitable para-substituted alkyl phenols are the para-substituted alkyl monohydric phenols having the formula:

wherein R is alkyl generally having 4 to 15 carbon atoms inclusive and preferably having 9 to 12 carbon atoms inclusive. Among suitable alkyl radicals are the following; butyl, amyl, hexyl, heptyl, octyl, nonyl, decyl, undecyl, dodecyl, tridecyl and the like. Specific compounds include, among others, p-t-butylphenol, p-amylphenol, p-octylphenol, p-nonylphenol, p-dodecylphenol and the like, which can be straight chain or branched.

Suitable dihydroxydiphenyl alkanes can be represented structurally by the following formula:

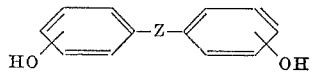

wherein Z is a divalent hydrocarbon radical having a maximum of 4 carbon atoms such as alkylene, alkylidene and the like and each OH group is in a position other than meta with respect to the divalent hydrocarbon radical. Exemplary of specific dihydroxy diphenyl compounds are the following: 2,2-bis(p-hydroxy phenyl) propane, commonly referred to as Bisphenol A, 2,4'-dihydroxydiphenyl propylidene, 4,4-dihydroxydiphenylmethane, 2,4'-dihydroxydiphenylmethane and the like.

The amount of dihydroxy diphenyl alkane relative to the para-substituted alkyl phenol, used to prepare the heat-hardenable phenolic resins of this invention is about 0.25 mole to about 1.5 moles, and preferably about 0.4 mole to about 0.7 mole, per mole of para-substituted alkyl phenol.

Examples of aldehydes which can be condensed with the phenols listed above to produce the phenol-aldehyde resins are: formaldehyde in any of its available forms, i.e. formalin and para-formaldehyde and the like.

The amount of aldehyde used to prepare the heat-hardenable or resole resins of this invention is at least about 0.9 mole per mole of "phenol," generally about 0.9 to about 3 moles and preferably about 0.9 to about 2.2 moles per mole of "phenol" (total amount of "phenol" in the reaction mixture).

The condensation of "phenol" and aldehyde to produce the heat-hardenable phenolic resins is carried out in a reaction medium containing an alkaline catalyst. Illustrative of suitable catalysts are the following: alkali metal and alkaline earth metal hydroxides or oxides, as for example, sodium hydroxide, potassium hydroxide, calcium hydroxide, calcium oxide, barium hydroxide, barium oxide and the like.

The amount of catalyst used in producing the resole resins is about 0.05 to about 0.2 mole per mole of "phenol." For a detailed discussion of condensates produced from a phenol and an aldehyde and methods for the production thereof, reference is made to the following: "Phenolic Resins" by W. A. Keutgen, Encyclopedia of Polymer Science and Technology, vol. 10, pp. 1–73, published by Interscience, John Wiley—1969; U.S. Pat. 2,-586,385, patented Feb. 19, 1952.

The heat-hardenable phenolic resins can be admixed with a wide variety of rubbers to produce the compositions of this invention. Illustrative of such rubbers are the natural rubbers: balata, caoutchouc, caucho, gutta percha, gutta-siak, juleting, kickxia, manihot, latex from the *Hevea krusiliensis*; synthetic diene polymers, such as homopolymers of hydrocarbons containing two unsaturated bonds such as butadiene-1,3, 2,3-dimethylbutadiene-1,3 and the like, or copolymers of these with one or more copolymerizable mono-olefinic compounds. Copolymerizable monoolefinic compounds are organic compounds which contain a single olefinic double bond

and which are copolymerizable with butadiene-1,3 hydrocarbons. Such compounds are usually low molecular weight compounds of less than 10 carbon atoms which contain at least two hydrogen atoms and at least one radical other than hydrogen attached to the unsaturated double bond carbon atoms, as in the structure:

where at least one of the disconnected valences is attached to a group other than hydrogen, such as, chlorine, alkyl, alkoxy, cyano or aryl.

Examples of such compounds include styrene, p-methylstyrene, alpha-methylstyrene, p-chlorostyrene, vinyl naphthalene and similar aryl olefins and substituted aryl of olefins; isobutylene and similar copolymerizable olefinic hydrocarbons; acrylic and substituted acrylic acids and their esters, nitriles and amides such as acrylic acid, acrylonitrile, methacrylonitrile, alpha-chloroacrylonitrile, methylacrylate, methylmethacrylate, ethylmethacrylate, methyl alpha-chloro-acrylate, acrylamide, methacrylamide and the like; vinyl methyl ketone, vinyl methyl ether, vinylidene chloride, N-vinyl carbazole, N-vinyl pyrrolidone and similar copolymerizable compounds containing a single olefinic double bond. Other suitable rubbers are the chlorohydrin rubbers, polychloroprene rubbers, the allylglycidyl ether-propylene oxide rubbers and the like.

Particularly desirable rubbers, for purposes of this invention, are the nitrile rubbers, e.g., butadiene-acrylonitrile rubbers including carboxyl containing nitrile rubbers. A composition containing a nitrile rubber and a heat-hardenable phenolic resin, as described, has excellent bonding strength, in addition to providing an adhesive which does not undesirably stain thermoplastic vinyl film. Furthermore, on adding magnesium oxide or magnesium hydroxide to a composition containing a nitrile rubber and a heat-hardenable phenolic resin, a composition is obtained which has the properties described in the preceding sentence and in addition, has excellent Peel Strength and Dead Load Hot Strength. Magnesium oxide or magnesium hydroxide is generally used in amounts of about 1 to about 20 percent by weight and preferably about 4 to about 10 percent by weight based on the weight of the heat-hardenable phenolic resin (on a solids basis).

The compositions of this invention can be prepared by admixing the components thereof in any suitable agitated vessel such as a Cowles Dissolver and the like. Sufficient organic solvent such as methyl ethyl ketone, acetone and the like is admixed therewith to provide a composition having the desired viscosity for use in adhesive applications.

Standard additives such as fillers, anti-oxidants, thixotropes, pigments and the like can be added to the compositions of this invention in amounts well known in the art.

As previously stated, the compositions of this invention are of particular utility in bonding thermoplastic vinyl films to various substrates. Thermoplastic vinyl films can be produced by methods well known in the art from vinyl resins as for example vinyl halide resins. Suitable vinyl halide resins include homopolymers of a monomer having the formula:

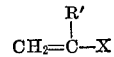

wherein X is a halogen atom, e.g., chlorine, bromine, iodine or fluorine and R' is hydrogen or one of the above named halogens; and polymers of such monomers and at least one other monoethylenically unsaturated monomer wherein the polymers contain at least about 80 percent by weight.

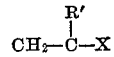

Examples of such monoethylenically unsaturated monomers are the vinyl esters such as vinyl acetate, vinyl propionate, vinyl butyrate, vinyl chloroacetate, vinyl chloropropionate, vinyl benzoate, vinyl chlorobenzoate; acrylic and N-substituted acrylic acids, their alkyl esters, their amides and their nitriles such as acrylic acid, chloroacrylic acid, methacrylic acid, ethacrylic aid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, acrylamide, N-methyl acrylamide, N,N-dimethyl acrylamide, acrylonitrile, chloroacrylonitrile, methacrylonitrile, ethacrylonitrile; vinyl aromatic compounds such as styrene, dichlorostyrene, vinyl naphthalene; alkyl esters of maleic and fumaric acid such as dimethyl maleate, diethyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; also vinyl pyridine. N-vinyl carbazoyl, N-vinyl pyrrolidine and the like.

The following examples further illustrate the present invention, and are not intended to limit the scope thereof in any manner.

EXAMPLE 1

Fifty parts by weight of a solution of heat-hardenable phenolic resin in methyl ethyl ketone, containing 25 percent by weight solids, were admixed with 50 parts by weight of a solution of nitrile rubber in methylethyl ketone, containing 25 percent by weight solids, in a Cowles Dissolver. The resultant "adhesive" composition was brush coated onto the cloth side of a flexible, polyvinyl chloride film, the polyvinyl chloride having been plasticized with dioctylphthalate, and also brush coated onto the surface of a steel panel which was 2 inches square. The thickness of the wet adhesive on both the vinyl film and the steel panel was about 3 mils. The adhesive coated surfaces were allowed to dry for 15 minutes at a temperature of 73° C., under a relative humidity of 50 percent. Surfaces were then pressed together manually using a 10 lb. roller.

The resultant panel was exposed for 250 hours, with the vinyl film side toward the light source, in a "Fadometer" and the vinyl film examined visually after the 250 hour period. Little if any staining was observed.

The heat-hardenable phenolic resin of this example had a softening point of 192° F. and a gel time at 150° C. of 126. This resin was produced by condensing a mixture of 1 mole of p-nonylphenol, 0.6 mole of 2,2-bis(p-hydroxyphenyl)propane and 3.2 moles of formaldehyde in the presence of aqueous sodium hydroxide (25% strength).

The nitrile rubber was a copolymer of acrylonitrile and butadiene-1,3 containing 40 percent by weight combined acrylonitrile.

Gel time.—Determined by placing a one gram sample of the resin on a hot plate which was at a temperature of 150° C. The resin was stroked with a spatula and the time required to reach a "no string" condition noted and reported as the gel time. A "no string" condition is reached when there is no pulling of strings of the material, by the spatula, from the main body of the resin.

EXAMPLE 2

Example 1 was repeated with the exception that the phenolic resin used was obtained by condensing a mixture of one mole of p-t-butylphenol, 0.658 mole of 2,2-bis(p-hydroxyphenyl)propane and 2.32 moles of formaldehyde using sodium hydroxide as the catalyst to a heat-hardenable phenolic resin having a softening point of 223° F. and a gel time of 10 minutes.

Staining characteristics.—Very little staining observed.

CONTROL 1

Example 1 was repeated with the exception that the phenolic resin used was obtained by condensing a mixture of 0.85 mole of phenol, 0.185 mole of o-cresol and 0.76 mole of formaldehyde using sodium hydroxide as a catalyst to a heat-hardenable phenolic resin having a softening point of 180° F. and a gel time of 90 seconds.

Staining characteristics.—Very excessive staining.

EXAMPLE 3

This example illustrates the excellent properties of a composition based on nitrile rubber, a heat-hardenable resin and magnesium oxide.

Compositions, the formulations of which are set forth below, were prepared by admixing the components thereof in a Cowles Dissolver and tested. The tests and results thereof are also set forth below.

| Composition | Parts by weight | |
|---|---|---|
| | A | B |
| Heat hardenable phenolic resin (solids basis) (described in Example 1) | 100 | 100 |
| Nitrile rubber—solids basis (described in Example 1) | 100 | 100 |
| Magnesium oxide | 0 | 5 |
| Methyl ethyl ketone | 467 | 467 |
| Peel strength, ASTM D 903–49T lb./inch | 27 | 42 |
| Dead Load Hot Strength | 130 | 170 |
| Staining characteristics | (¹) | (¹) |

¹ Very little observed.

The Dead Load Hot Strength is described in detail in a Union Carbide Corporation Publication, Publication No. F-42997, published February 1972.

Also, it is to be noted that the disclosure of all references noted are incorporated herein by reference.

In addition, it is to be noted that the compositions of this invention can be used to bond vinyl films to surfaces such as wood, cloth, plastics including polyesters, epoxides rubbers and the like. Furthermore, mixtures of the dihydroxydiphenyl alkanes and/or mixtures of the p-substituted alkyl phenols can be used in producing suitable heat hardenable phenolic resins.

What is claimed is:

1. A composition consisting essentially of a heat hardenable phenolic resin which is the condensation reaction product of a mixture containing an aldehyde, a para-substituted alkyl phenol and a dihydroxy diphenyl alkane wherein the aldehyde is present in an amount of about 0.9 mole to about 3 moles of aldehyde per mole of phenol and the dihydroxy diphenylalkane is present in an amount of about 0.25 mole to about 1.5 moles per mole of said alkyl phenol; and a rubber selected from the group consisting of natural rubbers, synthetic diene rubbers, chlorohydrin rubbers, and allylglycidyl ether-propylene oxide rubbers in an amount of about 50 to about 400 percent by weight based on the weight of said heat hardenable resin.

2. A composition as defined in claim 1 wherein the rubber is present in an amount of about 100 to about 200 percent by weight based on the weight of said heat-hardenable phenolic resin.

3. A composition as defined in claim 1 wherein the dihydroxydiphenyl alkane is present in an amount of about 0.4 to about 0.7 mole per mole of said alkyl phenol.

4. A composition as defined in claim 1 wherein the rubber is a diene rubber.

5. A composition as defined in claim 1 wherein the aldehyde is formaldehyde, the dihydroxy dipheny alkane is 2,2-bis(p-hydroxyphenyl)propane, the alkyl phenol is p-nonyl phenol or p-t-butyl phenol and the rubber is a diene rubber.

6. A composition as defined in claim 1 containing magnesium oxide or magnesium hydroxide.

7. A composition as defined in claim 5 wherein the diene rubber is a copolymer of butadiene and acrylonitrile.

8. A composition as defined in claim 1 wherein the synthetic diene rubber is a polychloroprene rubber.

9. A composition as defined in claim 4 wherein the diene rubber is a copolymer of a diene and a coplymerizable mono-olefinic compound.

10. A composition as defined in claim 9 wherein the copolymerizable mono-olefinic compound is selected from the group having the structure

wherein at least one of the disconnected valences is selected from the group of chlorine, alkyl, alkoxy, cyano or aryl.

11. A composition as defined in claim 10 wherein the copolymerizable mono-olefinic compound is acrylonitrile.

12. A composition as defined in claim 9 wherein the diene is butadiene.

13. A composition as defined in claim 1 wherein the para-substituted alkyl phenol is one of the group having the formula:

wherein R is alkyl having from 4 to 15 carbon atoms inclusive, or mixtures thereof.

14. A composition as defined in claim 13 wherein R is alkyl having from 9 to 12 carbon atoms inclusive, or mixtures thereof.

15. A composition as defined in claim 1, wherein the dihydroxy diphenyl alkane is one of the group having the formula:

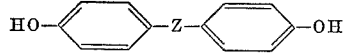

wherein Z is a divalent hydrocarbon radical having a maximum of 4 carbon atoms, or mixtures thereof.

16. A composition as defined in claim 15 wherein the dihydroxy diphenyl alkane is 2,2-bis(p-hydroxy phenyl) propane.

17. A composition as defined in claim 1 wherein the aldehyde is present in an amount of about 0.9 mole to about 2.2 moles per mole of total phenol.

References Cited

UNITED STATES PATENTS

| 3,478,127 | 11/1969 | Petersen | 260—845 |
| 3,159,597 | 12/1964 | Forsythe | 260—845 |
| 3,000,847 | 9/1961 | Graham | 260—845 |
| 3,220,964 | 11/1965 | Giller | 260—846 |
| 3,044,977 | 7/1962 | Coe | 260—845 |

JOHN C. BLEUTGE, Primary Examiner

U.S. Cl. X. R.

161—248; 260—3, 846

PO-1050
(5/69)

UNITED STATES PATENT OFFICE
CERTIFICATE OF CORRECTION

Patent No. 3,851,012         Dated  November 26, 1974

Inventor(s) Willian Wertz and Stanley Richardson

It is certified that error appears in the above-identified patent and that said Letters Patent are hereby corrected as shown below:

Column 2, formula starting on line 25 as follows:

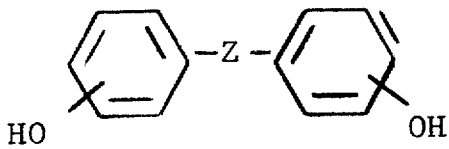

should read:

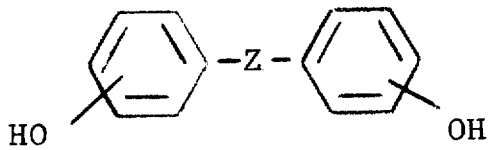

Column 3, line 31, after substituted aryl delete "of".

Column 6, line 2, "dipheny" should read --diphenyl--.

Column 6, line 14, "coplymerizable" should read --copolymerizable--.

Signed and Sealed this twenty-ninth Day of July 1975

[SEAL]

Attest:

RUTH C. MASON
Attesting Officer

C. MARSHALL DANN
Commissioner of Patents and Trademarks